Patented Oct. 19, 1954

2,692,288

UNITED STATES PATENT OFFICE 2,692,288

PRODUCTION OF N-TERTIARY ALKYLATED AROMATIC SECONDARY DIAMINES

Alan Bell and M B Knowles, Kingsport, Tenn., assignors to Eastman Kodak Company, Rochester, N. Y., a corporation of New Jersey No Drawing. Application March 29, 1951, Serial No. 218,261

12 Claims. (Cl. 260—576)

This invention relates to di-tertiary-alkyl aromatic diamines and methods for production thereof. More particularly, it relates to alkylations in which tertiary alkyl groups containing 4 to 8 carbon atoms are substituted in amine groups of aromatic diamines to produce secondary amine groups. It especially contemplates the preparation of N,N'-di-tertiary-butyl-p-phenylene-diamine by the reaction of p-phenylene-diamine with tertiary-butyl alcohol.

It is known to react primary and secondary alcohols with primary aromatic amines to form corresponding N-alkyl substituted amines. Unless very special conditions of reactions are observed, however, the tertiary amines are formed in these processes, that is, dialkylation of the amine group takes place. In addition, alkylation of the aromatic nucleus may be effected particularly if elevated temperatures are employed. Thus, a mixture of products is obtained, reducing the yield of monoalkylated amine product, and necessitating the use of special separation procedures to remove the secondary amine product (monoalkylated) from the tertiary amine product (dialkylated), the unreacted primary amine, and any nuclearly alkylated amine products.

In past proposals, tertiary amine products are always obtained when large mole ratios of primary or secondary alcohols to primary aromatic amines or their hydro-halide salts are employed in the reaction. Then to obtain secondary amines from primary amines by alkylation, this ratio has been kept generally at 2 to 1 or lower. Even at these low ratios unless special conditions of reaction are observed, dialkylated or tertiary amines result. For example, Staedel, German Patent 21,241, dated February 3, 1882, obtained near quantitative yields of N,N-diethyl-aniline, N,N-diethylorthotoluidine and N,N-diethylparatoluidine by heating ethyl alcohol with the corresponding primary amine hydroiodides at 145° C. to 150° C. In these procedures the mole ratio of ethyl alcohol to amine was kept at 1.1 to 1. Essentially the same results were obtained when the amine hydrobromides were employed. Reilly and Hickinbottom, J. Chem. Soc. 113, 102,976 (1918) obtain the products N-monobutylaniline, N,N-dibutylaniline and p-butylaniline from the reaction of aniline hydrochloride with normal butyl alcohol. Finally Carleton et al., in U. S. Patent 1,994,852 obtained mixtures of mono-N-alkylated and di-N-alkylated aromatic amines using primary and secondary alcohols by following restricted conditions such as first forming a partial amine salt by reaction of a mole of primary amine with 0.6 to 0.9 mole of hydrochloric acid and then alkyltaing with 1.9 to 2. moles of a primary or secondary alcohol. In our process for the preparation of N-tertiary alkylated aryl-diamines, we obtain no complexity of products. Good yields of the secondary amine products are obtained without formation of tertiary amine products even where very high mole ratios of tertiary alcohols to primary aromatic diamines is employed. In addition, we have found no nuclearly alkylated aromatic diamine products and we have discovered that we do not have to limit our mole ratio of mineral acid catalyst to amine group at 0.6:1 to 0.9:1. In fact, our preferred conditions for reaction, as will be described hereinafter, call for a mole ratio of tertiary alcohol to diamine of greater than 4:1 and a ratio of hydrohalogenic acid to primary amine equivalent of 1:1.

Tertiarybutyl alcohol and other tertiary alcohols have not been employed heretofore in the preparation of N-alkylated aromatic amines. It was to be expected prior to our discovery that excessive dehyration of the tertiary alcohol would result under the conditions of reaction and it was also expected that mixtures of secondary and tertiary amine products would result. The methods employed in the past to prepare N-tertiary-butyl-aniline for example, call for the use of aniline and tertiary-butyl iodide. This procedure which is described by Hickinbottom, J. Chem. Soc. 1933, 946, is attended with certain deficiencies, such as low yields of desired product, instability of tertiary-alkyl iodides under basic conditions, and the use of tertiary-alkyl iodides which are relatively expensive laboratory reagents. Hickinbottom's process, although well adapted for laboratory preparation, cannot be considered of commercial utility in view of the last-mentioned feature. Further, we have found this reaction to be so highly exothermic, that reduced yields of product are obtained when large amounts of reactants are used. Finally we have carried out numerous experiments following the procedures of Hickinbottom and also Nef, Analen 309, 164 and have been unable to prepare N,N'-ditertiary-alkyl-aromatic-diamines such as N,N'-ditertiary-butyl-phenylenediamine by the use of these methods.

A principal purpose of this invention is to provide a new and improved method for producing N-tertiary-alkylated aromatic secondary diamines. Another object is the production of N,N'-di-tertiary-alkyl aromatic diamines particularly those with tertiary-alkyl groups containing 4 to 8 carbon atoms by an easily controlled process which is characterized by its flexibility. A further object is the production of oxygen-resistant and color-stable N,N'-di-tertiary-butyl-p-phenylenediamine. A still further object of the invention is the production of tertiary-alkylated secondary diamines from primary diamines in such a manner that the reaction product contains no tertiary-alkylated-tertiary amine groups, or in other words, that the primary amine groups of the aromatic diamine are mono-alkylated and not di-alkylated by the process. Other objects of the invention will become apparent hereinafter.

These objects are accomplished according to the invention whereby N,N'-di-tertiary-alkyl aromatic diamines are produced from aromatic diamines with a tertiary-alkyl alcohol and in the presence of acid catalysts selected from the group HCl, HBr, HI, alone or in conjunction with small amounts of iodine, or the dehydrating mineral acid catalysts sulfuric acid or the oxy-acids of phosphorus in conjunction with iodine, or in the presence of catalytic amounts of iodine alone. The reaction takes place under conditions of elevated temperature and pressure. The N,N'-di-tertiary-alkylated diamine may be recovered in any suitable manner, and unreacted primary diamine and partially reacted diamine reprocessed. The tertiary-alkylated diamines so produced are useful as antioxidants or stabilizers for petroleum products and polymeric materials such as rubber. The N,N'-di-tertiary-butylated aromatic diamines are particularly useful in that the amine groups are stable to the effects of air and light and the compounds retain good color as compared with corresponding primary- or secondary-alkylated aromatic diamines.

According to a preferred embodiment, the invention is applied to the alkylation of p-phenylene diamine, in the form of the amine hydrochloride salt, by reacting the amine salt with tertiary-butyl alcohol in the presence of a small amount of iodine; under autogenous pressure and at elevated temperature, the reaction being so controlled as to produce only the N,N'-di-tertiary butyl-p-phenylene diamine, and not the N,N,N',N'-tetra-tertiary-butyl - p - phenylene diamine, nor the N,N,N' - tri - tertiary - butyl - p-phenylene diamine.

The following examples will serve to illustrate our process.

*Example 1.—N,N'-di-tertiary-butyl-p-phenylenediamine*

One hundred and ninety-three parts of phenylenediamine were combined with 49 parts of hydrogen chloride and then heated together with 495 parts of tertiary butyl alcohol for 5 hours at 180° C. The reaction mixture was taken up with water and made basic with concentrated ammonium hydroxide solution followed by extraction with ether. The extract was dried, the solvent removed, and the residue distilled. The distillate of boiling range 116 to 135° C./3 mm., was suspended in water and treated with acetic anhydride. The excess acetic anhydride used was allowed to hydrolyze. The mixture was filtered, made basic with sodium carbonate and extracted with ether. Fractionation of extracted material gave 17.7 parts B. P. 106.5 to 139/1–3 mm. 6.7 parts of white crystalline solid M. P. 77–79.5° C. were obtained when the distillate was crystallized twice from a water-alcohol mixture. This product analyzed for N,N'-di-tertiary-butyl-p-phenylenediamine giving C, 76.45, H, 11.04, N, 12.25, whereas calculated analysis for $C_{14}H_{24}N_2$ is C, 76.31, H, 10.98, N, 12.72. Further proof of identity was made by preparing N,N' dinitroso derivative of M. P. 210–212° C., which analyzed for $C_{14}H_{22}N_4O_2$ and by oxidizing the product with chromic acid to 1,4 benzoquinone.

*Example 2.—N,N'-di-tertiary-butyl-p-phenylenediamine*

A mixture of 2700 parts of tertiary-butyl alcohol, 650 parts of p-phenylenediamine hydrochloride, and 0.5 parts of iodine were heated for 5 hours at 170–180° C. in a rocking steel autoclave. The reaction mixture was washed out of the autoclave with 1000 parts of water and a large quantity of solid present was separated from this water mixture. This solid was dissolved in 1500 parts of water and the resulting solution was made basic with concentrated ammonium hydroxide solution to give a grey crystalline material melting at 77–79° C.

The water solution from the autoclave, after removal of the above-mentioned solid, was distilled to remove unreacted tertiary-butyl alcohol. The residue was made basic with ammonium hydroxide solution and a dark oily product was obtained. This was dissolved in dilute acetic acid and shaken with 20 parts of benzaldehyde to remove any N-tertiary-butyl-p-phenylenediamine or other primary amines present. The mixture was extracted with ether, ammonium hydroxide was added and a grey crystalline material melting at 79–80° C. was obtained.

The two crystalline products were combined and distilled to obtain 133 parts of product boiling at 289–291° C. and melting at 77–78.5° C. Analysis for carbon, hydrogen and nitrogen of this compound and of its dinitroso derivative indicated that it was N,N' - di - tertiary-butyl-p-phenylenediamine. In addition oxidation of the product with chromic acid produced p-benzoquinone.

*Example 3.—N,N'-di-tertiary-butyl-m-phenylenediamine*

One hundred parts of m-phenylenediamine, 410 parts of tertiary-butyl alcohol and 0.5 parts of iodine were heated together at 170°–180° C. for five hours. The reaction products were then added to 800 parts of water and distilled to remove unreacted tertiary-butyl alcohol. The mixture was extracted with ether and the extract was discarded. After being made basic with concentrated ammonium hydroxide, the mixture again was extracted with ether. The ether extract was dried, the solvents were removed, and the residue distilled. There was obtained 53 parts of product boiling at 212–229° C. (80 mm.). In order to remove the primary amines present such as N - tertiary - butyl - m-phenylenediamine, the product was covered with 150 parts of water and 40 parts of glacial acetic acid. A white solid formed, although most of the material redissolved. This solid was collected and dried; the yield was 8 parts of N-N'-di-tertiary-butyl-m-phenylenediamine melting at 156–157° C. The formula $C_{14}H_{24}N_2$, calculates for C, 76.31; H, 10.98; N, 12.73. Analysis of this product gave C, 76.42; H, 10.95; N, 12.74.

*Example 4.—N-tertiary-butyl-2,4-diaminotoluene*

Tertiary butyl alcohol (480 parts), 2,4-diaminotoluene dihydrochloride (100 parts), and iodine (0.5 parts) were heated in a shaking type steel autoclave for five hours at 150° C. The reaction mixture was poured into 1000 parts of water and unreacted alcohol was removed by boiling. The solution was cooled, made basic with sodium carbonate and extracted with ether. The ether was removed, the residue dissolved in 700 parts of water containing 80 parts of acetic acid and the solution shaken with 80 parts of benzaldehyde for five minutes. After extracting with ether, the aqueous portion was made basic and the oil layer removed with ether. The extract was dried and the solvent removed leaving 34 parts of a brown oil which crystallized upon standing. After two recrystallizations from hexane, it melted at 56.6° to 58° C. and analyzed for the mono tertiary butyl derivative $C_{11}H_{18}N_2$ which calculates C, 74.1; H, 10.17; N, 15.72. The analysis gave C, 74.18; H, 10.28; N, 14.8. The material diazotizes readily and couples with beta naphthol.

Following the general processes outlined in the above examples, a series of preparations were carried out under a variety of conditions. The results are indicated in Table I. In all cases listed, the product recovered is the N,N'-dialkylated diamine.

the production of N,N-di-tertiary-alkylated diamines, N-tertiary-alkylated diamines are produced in the process and may be separated as such, and in the case where one amine group is hindered by ortho substitution as in Example 4, the end product of alkylation may be the N-tertiary-alkylated diamine. Generally, where both amine groups can be alkylated, we prefer not to separate mono-alkylated product from the reaction products, but to use it and the unreacted primary amine as reactants for preparing more N,N'-di-tertiary-alkylated aromatic diamines. The monoalkylated amines such as N-tertiary - butyl - p - phenylenediamine are useful in preparation of mixed alkylated amines, however, that is, the free primary amine group can be alkylated with an n-alkyl group if desired, or the monoalkylated aromatic diamines can be used as reactants in the present invention instead of the diprimary amines.

In carrying out the invention, it is preferable to heat the reactants together in a closed vessel so that the pressure of the reaction is the autog-

TABLE I

| Moles and Diamine Reacted | Moles and Alcohol Reacted | Catalyst Used | Quantity of Catalyst Used | Reaction Temperature, °C. | Conversion, percent |
|---|---|---|---|---|---|
| [0.5] p-phenylenediamine | [3] tert.-butyl alcohol | Iodine | 3 g | 200 | 1 |
| [1] p-phenylenediamine | [60] tert-butyl alcohol | HCl | 2 moles | 170 | 2 |
| Do | [42] tert.-butyl alcohol | HCl | 2 moles | 170 | 2 |
| [0.5] p-phenylenediamine | [2] tert.-butyl alcohol | {HCl / Iodine} | {0.5 moles / 0.5 g} | 160 | 8 |
| Do | [5] tert.-butyl alcohol | {H₂SO₄ / Iodine} | {3 g / 0.5 g} | 180 | 2 |
| Do | [3] tert.-butyl alcohol | {HBr / Iodine} | {1 mole / 0.5 g} | 190 | 9 |
| Do | [3] dimethylethyl carbinol | {HCl / Iodine} | {1 mole / 0.5 g} | 180 | 12 |
| Do | [5] dimethylneopentyl carbinol | {HCl / Iodine} | {1 mole / 0.5 g} | 180 | 8 |
| [0.5] 1,4-naphthalene diamine | [5] tert.-butyl alcohol | {HCl / Iodine} | {1 mole / 0.3 g} | 190 | 5 |
| [0.5] p,p'-diaminobiphenyl | [3] tert.-butyl alcohol | {HCl / Iodine} | {1 mole / 0.5 g} | 170 | 10 |

While the invention should not be limited by the above examples, it should be understood that this invention is limited to the use of saturated tertiary alkyl alcohols in conjunction with primary aromatic diamines, and while tertiary butyl alcohol is preferred for use in alkylations, the process is applicable in the employment of higher tertiary alcohols and is particularly useful in conjunction with tertiary alcohols containing 4 to 8 carbon atoms. In general, the class of amines which can be used in this process are primary aromatic diamines which may or may not be nuclearly substituted. Representative substituents which may be present on the ring without adversely affecting the process are alkyl (preferably 1 to 8 carbon atoms), aryl, cycloalkyl (5 to 6 carbon atoms), nitro, hydroxy, halogen, acyl, acyloxy, and alkoxy groups. These substituents should not be ortho to the amine group to be alkylated, however. We have made the unexpected discovery that ortho substitution tends to inhibit the alkylation of aromatic amine groups with tertiary alcohols and may entirely prevent the reaction from taking place, for instance, see Example 4. By the same principle, the two amine groups should not be ortho to each other. It is well known that in the alkylation of monoamines with primary alcohols such as ethyl alcohol, for example, ortho substitution seems to have little effect on the reaction, and compounds such as N,N-diethyl-o-toluidine can be prepared without difficulty.

Although this invention is directed mainly to enous pressure produced by the reaction mixture, thus the pressure produced will depend to a large extent on the proportions of reactants present as well as the temperature. When operating at high temperatures, say above 200° C., considerable decomposition of tertiary alkyl alcohol to olefin may take place and thus elevate the pressure to above 600 pounds per square inch. We have found no beneficial or detrimental effect by operating at high or low pressures and, hence, we prefer to operate at the autogenous pressure of the reaction—although we may vent off isobutylene for example, or other gases, or we may add pressure in the form of inert gases without unduly altering the preparation of desired products.

In the above examples the time of reaction in every case is 5 hours. Actually the time of reaction does not appear to be critical but rather depends upon the geometry of the reaction system, the quantities of materials used, the amount of agitation of the reactants, and so on, and to a lesser extent upon the nature of the reactants. We find in general the reactions can be completed in 1 to 24 hours, and the bulk of the reactions are completed in at least five hours. The optimum time for reaction can be determined empirically, very easily.

As can be seen from the results obtained in the examples, a variety of catalysts can be employed. The hydrohalogenic acids, HCl, HBr or HI can be used in ratios of 0.1:1 to 2.1:1 moles per mole of diamine, with a preferred ratio of 2:1. Iodine can be employed as a catalyst alone in small amounts of .01 to 5% based on the weight of amine. A combination of hydrohalogenic acids in concentrations mentioned above in combination with iodine in preferred amounts of about 0.05% to 2% is particularly useful to bring about good conversions to secondary diamines. Dehydrating mineral acids such as sulfuric acid and the oxy-acids of phosphorus such as phosphoric and phosphorous (0.1 to 4% based on amine) in combination with iodine (0.5 to 2%) may also be used as catalysts but do not appear to be as useful as the other catalysts mentioned. Too large a quantity of iodine may bring about excessive dehydration of the tertiary alcohol which, of course, is undesirable. The same reason limits the use of large proportions of sulfuric acid or the oxy-acids of phosphorus. The preferred catalysts are then the acids selected from the group HCl, HBr and HI alone or more preferably in conjunction with iodine. Of these acids hydrochloric acid is the most desirable to use because of its cost and ease of handling.

The acid catalysts may be added to the reaction mixture in a variety of ways, such as combined with part or all of the primary diamine as the hydrochloride for example, or as a solution or mixture with the tertiary-alkyl alcohol. Generally we prefer to use the amine salts directly.

The mole ratio of tertiary alcohol to aromatic amine may be varied from 2:1 to as high as 60 to 1 or higher as will be observed in Table I but mole ratios of greater than 4:1 are preferred with optimum results being obtained at mole ratios of 5:1 to 10:1. Although a 60:1 ratio or even higher ratios bring about just as good conversions as this latter optimum range, such high ratios only bring about waste of reaction vessel space.

The N-tertiary-alkylated secondary diamines can be prepared at temperatures of 150° C. to 220° C. The preferred temperature range is 170°–190° C. Actually some alkylation may take place at temperatures as low as 120° C. using preferred catalysts, but conversions are low. At temperatures above 220° C. excessive dehydration of the tertiary alcohol may take place.

The products prepared by this process as mentioned heretofore are especially useful as antioxidants. In addition we have made the surprising discovery that N,N'-di-tertiary butyl aromatic diamines are particularly stable to the effect of atmospheric oxygen as compared with the corresponding N,N'-secondary-alkyl or N,N'-di-normal-alkyl derivatives. Thus the N-tertiary-butyl derivatives may be termed oxygen resistant. For example, N,N'-di-tertiary-butyl-p-phenylenediamine can be made into a 0.5% benzene solution and this solution exposed to daylight and air for two weeks without coloration. Freshly prepared solution of 0.5% N,N'-di-secondary-butyl-p-phenylenediamine is not quite colorless and on exposure to light and air darkens rapidly in five or six days to produce a dark brown colored solution.

The antioxidant value of N,N'-di-tertiary-butyl-p-phenylenediamine as compared with N,N'-di-secondary-butyl-p-phenylenediamine (a standard gasoline antioxidant) can be observed in Table II where a Pennsylvania cracked gasoline was used in conjunction with these stabilizers in the standard oxygen bomb test (U. O. P.). The potency of the N,N'-di-tertiary-butyl derivative is about the same as the potency of the N,N'-di-secondary-butyl derivative.

TABLE II.—U. O. P. OXYGEN BOMB TEST

| Sample | Induction Period, Minutes |
|---|---|
| Cracked Gasoline | 45 |
| Cracked Gasoline+0.01% N,N'-di-sec.-butyl-p-phenylenediamine | 877 |
| Cracked Gasoline+0.01% N,N'-di-tert.-butyl-p-phenylenediamine | 840 |

It will be observed from the examples that only mono-tertiary-alkylaromatic amine groups are formed by this process, and not the dialkylated amine groups or nuclearly alkylated products. Of course, there may be varying amounts of unreacted primary amines present in the crude products but this can be separated from the secondary amine product readily and reprocessed. The fact that no complexity of alkylated products results is of commercial advantage since the secondary amines have great practical use as stabilizers.

The invention is advantageous to use in that the only known prior disclosures for producing tertiary-alkylated amines which demand the use of tertiary-butyl iodide, are not found to be applicable to the production of N,N'-di-tertiary alkyl-aromatic diamines.

Processes of producing N-tertiary alkylated aromatic secondary monoamines such as N-tertiary-butylaniline and the like are disclosed and claimed in our copending application Serial No. 218,262, filed on even date herewith.

What we claim as our invention is:

1. A process for producing N-tertiary alkylated aromatic secondary diamines which comprises reacting one mole proportion of a carbocyclic aromatic primary diamine with from 2 to 60 mole proportions of a saturated tertiary alkyl alcohol containing from 4 to 8 carbon atoms in the presence of a catalyst at a temperature of from 150° to 220° C., said aromatic diamine containing from 6 to 15 carbon atoms wherein the —NH₂ groups are in nuclear positions with respect to each other which are other than adjacent, the aromatic diamine also containing nuclear substituents which are in positions other than ortho to one of the —NH₂ groups, which substituents are selected from the group consisting of a hydrogen atom, an alkyl radical containing from 1 to 8 carbon atoms, an aryl radical containing from 6 to 9 carbon atoms, a cycloalkyl radical containing from 5 to 6 carbon atoms, a nitro radical, a hydroxy radical, a halogen atom, a —CO—R radical, a —CO—OR radical and an —OR radical wherein each R represents an alkyl radical containing from 1 to 8 carbon atoms, said catalyst comprising at least one material selected from among those materials of the following subgroups (A) from about 0.1 to about 1.1 mole proportions of HCl, HBr and HI, (B) from about 0.01 to about 5% by weight based on the weight of the aromatic diamine of iodine, (C) a combination of a material defined by subgroup (A) and the material defined by subgroup (B), (D) a combination of the material as defined by subgroup (B) and from about 0.1 to about 4% by weight based on the weight of the aromatic diamine of sulfuric acid, (E) a combination of the material defined by subgroup (B) and from about 0.1 to about 4% by weight based on the weight of the aromatic diamine of an oxyacid of phosphorous.

2. A process according to claim 1 in which the primary aromatic diamine is paraphenylenediamine.

3. A process according to claim 1 in which the primary aromatic diamine is metaphenylenediamine.

4. A process according to claim 1 in which the primary aromatic diamine is 2,4-diaminotoluene.

5. A process according to claim 1 in which the primary aromatic diamine is 1,4-naphthalenediamine.

6. A process according to claim 1 in which the primary aromatic diamine is p,p'-diaminobiphenyl.

7. A process of producing N,N'-di-tertiary butyl paraphenylenediamine which comprises reacting a mole proportion of paraphenylenediamine dihydrochloride with 5 to 10 mole proportions of tertiary butyl alcohol in the presence of 0.5 to 2 per cent of iodine, based on the weight of paraphenylenediamine present in the amine salt employed, at a temperature of 170° to 190° C.

8. A process of producing N,N'-di-tertiary butyl metaphenylenediamine which comprises reacting a mole proportion of metaphenylenediamine dihydrochloride with 5 to 10 mole proportions of tertiary-butyl alcohol in the presence of 0.5 to 2 per cent of iodine, based on the weight of metaphenylenediamine present in the amine salt employed, at a temperature of 170° to 190° C.

9. A process of producing N-tertiary butyl-2,4-diamino toluene which comprises reacting a mole proportion of 1,4-diaminotoluene dihydrochloride with 5 to 10 mole proportions of tertiary-butyl alcohol in the presence of 0.5 to 2 per cent of iodine based on the weight of 2,4-diamino-toluene present in the amine salt employed, at a temperature of 170° to 190° C.

10. A process of producing N,N'-di-tertiary butyl-1,4-naphthalenediamine which comprises reacting a mole proportion of 1,4-naphthalenediamine dihydrochloride with 5 to 10 mole proportions of tertiary-butyl alcohol in the presence of 0.5 to 2 per cent of iodine based on the weight of 1,4-naphthalenediamine present in the amine salt employed, at a temperature of 170° to 190° C.

11. A process of producing N,N'-di-tertiary butyl-p,p'-diaminobiphenyl which comprises reacting a mole proportion of p,p'-diaminobiphenyl dihydrochloride with 5 to 10 mole proportions of tertiary-butyl alcohol in the presence of 0.5 to 2 per cent of iodine based on the weight of p,p'-diaminobiphenyl present in the amine salt employed, at a temperature of 170° to 190° C.

12. A process according to claim 1 in which the saturated tertiary alkyl alcohol is tertiary-butyl alcohol.

References Cited in the file of this patent

UNITED STATES PATENTS

| Number | Name | Date |
| --- | --- | --- |
| 1,994,852 | Carleton et al. | Mar. 19, 1935 |
| 2,073,671 | Andrews | Mar. 16, 1937 |
| 2,391,139 | Dickey et al. | Dec. 18, 1945 |

OTHER REFERENCES

Sidgwick, "Organic Chemistry of Nitrogen" (1942), page 522.

Maier-Bode, "Das Pyridin and seine Derivate" (1934), page 112.